(12) United States Patent
Wang et al.

(10) Patent No.: US 9,575,387 B2
(45) Date of Patent: Feb. 21, 2017

(54) POLYMER STABILIZING LIQUID CRYSTAL LENS, METHOD FOR MANUFACTURING THE SAME, DISPLAY DEVICE AND ELECTRONIC PRODUCT

(71) Applicant: BOE TECHNOLOGY GROUP CO., LTD., Beijing (CN)

(72) Inventors: Xinxing Wang, Beijing (CN); Jaegeon You, Beijing (CN); Jikai Yao, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 150 days.

(21) Appl. No.: 14/396,095

(22) PCT Filed: Dec. 17, 2013

(86) PCT No.: PCT/CN2013/089722
§ 371 (c)(1),
(2) Date: Oct. 22, 2014

(87) PCT Pub. No.: WO2015/014081
PCT Pub. Date: Feb. 5, 2015

(65) Prior Publication Data
US 2016/0018680 A1 Jan. 21, 2016

(30) Foreign Application Priority Data
Jul. 31, 2013 (CN) .......................... 2013 1 0329466

(51) Int. Cl.
*G02F 1/1333* (2006.01)
*G02F 1/137* (2006.01)
(Continued)

(52) U.S. Cl.
CPC ................. *G02F 1/137* (2013.01); *C25B 3/00* (2013.01); *G02B 3/14* (2013.01); *G02B 27/22* (2013.01);
(Continued)

(58) Field of Classification Search
CPC ................ G02F 1/1334; G02F 1/13342; G02F 2001/13347
See application file for complete search history.

(56) References Cited

U.S. PATENT DOCUMENTS

| 5,847,798 A | 12/1998 | Yang et al. | |
|---|---|---|---|
| 6,619,799 B1 * | 9/2003 | Blum ..................... | G02B 7/285 351/159.39 |

(Continued)

FOREIGN PATENT DOCUMENTS

| CN | 102062965 | 5/2011 |
|---|---|---|
| CN | 102226861 | 10/2011 |

(Continued)

OTHER PUBLICATIONS

Translation of CN 202600323 Dec. 12, 2012.*
(Continued)

*Primary Examiner* — Phu Vu
(74) *Attorney, Agent, or Firm* — Baker Hostetler LLP (57) ABSTRACT

The present disclosure disclose a polymer stabilizing liquid crystal lens and a method for manufacturing the same, a display device and an electronic product. The polymer stabilizing liquid crystal lens includes a first substrate with a first electrode, a liquid crystal layer and a second substrate with a second electrode. The liquid crystal layer is disposed between the first electrode and the second electrode. The first electrode includes a plurality of electrode units. A periodic electric field which has voltages varying periodically is generated between the plurality of electrode units (Continued)

and the second electrode. The liquid crystal layer includes polymers and liquid crystal molecules. The liquid crystal molecules are deflected under action of the periodic electric field before the polymers are stabilized, and are maintained at a deflecting angle after the polymers are stabilized.

20 Claims, 5 Drawing Sheets (51) Int. Cl.
G02F 1/1334 (2006.01)
G02F 1/29 (2006.01)
G02B 27/22 (2006.01)
G02B 3/14 (2006.01)
C25B 3/00 (2006.01)
G02F 1/1343 (2006.01)
H04N 13/02 (2006.01)

(52) U.S. Cl.
CPC ......... *G02B 27/225* (2013.01); *G02F 1/13342* (2013.01); *G02F 1/134309* (2013.01); *G02F 1/29* (2013.01); *G02B 27/2214* (2013.01); *G02F 2001/13775* (2013.01); *G02F 2001/294* (2013.01); *H04N 13/0235* (2013.01)

(56) References Cited

U.S. PATENT DOCUMENTS

| 7,064,800 B2* | 6/2006 | Tung ................. G02F 1/133514 349/106 |
| 2012/0069255 A1 | 3/2012 | Takagi et al. |
| 2015/0022746 A1* | 1/2015 | Ichihashi .......... G02F 1/133606 349/15 |

FOREIGN PATENT DOCUMENTS

| CN | 102566192 | 7/2012 |
| CN | 102819147 | 12/2012 |
| CN | 202600323 | 12/2012 |
| CN | 103399444 | 11/2013 |
| CN | 203444221 | 2/2014 |

OTHER PUBLICATIONS

First Office Action issued in corresponding Chinese Application No. 2013103294661 dated May 22, 2015.
International Search Report and Written Opinion issued in corresponding International Application No. PCT/CN2013/089722 dated May 14, 2014.

* cited by examiner

Fig. 3e

POLYMER STABILIZING LIQUID CRYSTAL LENS, METHOD FOR MANUFACTURING THE SAME, DISPLAY DEVICE AND ELECTRONIC PRODUCT

CROSS-REFERENCE TO RELATED APPLICATION

This application is the U.S. national phase of PCT Application No. PCT/CN2013/089722 filed on Dec. 17, 2013, which claims the priority to Chinese Patent Application No. 201310329466.1 filed with the Chinese Patent Office on Jul. 31, 2013, which is incorporated herein by reference in its entirety.

TECHNICAL FIELD

The present disclosure relates to the field of the display technology, and particularly to a polymer stabilizing liquid crystal lens, a method for manufacturing the same, a display device and an electronic product.

BACKGROUND

With the development of the naked-eye three dimensions (3D) display, various 3D technologies emerge as the times require. Since a liquid crystal microlens has advantages of having an adjustable and controllable focal length, thus, the liquid crystal microlens is widely applied in the 3D display.

A 3D lens which provides different pretilt angles for individual subunits by using a photo alignment technology is disclosed in the prior art, and the 3D lends may display a 3D picture when no voltage is applied. However, this technology has a disadvantage that liquid crystals have a hybrid orientation and the liquid crystal molecules have a twisted structure and thus have a low light transmittance.

SUMMARY

One technical problem to be solved by the present disclosure is how to provide a polymer stabilizing liquid crystal lens, a method for manufacturing the same, a display device and an electronic product, so as to improve light transmittance of a lens.

The present disclosure provides a polymer stabilizing liquid crystal lens, which includes a first substrate, a first electrode, a liquid crystal layer, a second electrode and a second substrate; wherein the first electrode is disposed on the first substrate;

the second electrode is disposed on the second substrate;

the liquid crystal layer is disposed between the first electrode and the second electrode; the first electrode includes a plurality of electrode units, and a periodic electric field which has voltages varying periodically is generated between the plurality of electrode units and the second electrode; and the liquid crystal layer includes polymers and liquid crystal molecules; the liquid crystal molecules are deflected under action of the periodic electric field before the polymers are stabilized, and are maintained at a deflecting angle after the polymers are stabilized.

Optionally, the liquid crystal layer is divided into a plurality of liquid crystal layer sub-regions in an arranging direction of the plurality of the electrode units, the number of the liquid crystal layer sub-regions is equal to the number of the electrode units;

a length of each of the electrode units in the arranging direction is equal to a length of the liquid crystal layer sub-region within a projection area of the each of the electrode units in the arranging direction;

the liquid crystal molecules within each of the liquid crystal layer sub-regions are deflected at a corresponding angle under action of the periodic electric field; the liquid crystal molecules within each of the liquid crystal layer sub-regions are maintained at a deflecting angle, respectively, after the polymers are stabilized, and the liquid crystal layer has a 3D lens effect.

Optionally, a content of the polymers in the liquid crystal layer may be less than 10%.

Optionally, the first substrate and the second substrate may be made of resin, glass or plastic material.

The present disclosure further provides a display device, which includes a display screen and a polymer stabilizing liquid crystal lens provided on the display screen.

The present disclosure further provides a method for manufacturing a polymer stabilizing liquid crystal lens, which includes:

performing an alignment process on a first substrate provided with a first electrode and a second substrate provided with a second electrode, oppositively arranging the first substrate and the second substrate which are subjected to the alignment process to form a cell, and injecting a mixed liquid of polymer monomers and liquid crystal molecules into the cell; the first electrode including a plurality of electrode units;

generating a periodic electric field which has voltages varying periodically between the second electrode and the plurality of electrode units of the first electrode; the liquid crystal molecules within a projection area of each of the electrode units being deflected at a corresponding angle under action of the periodic electric field;

maintaining the periodic electric field and exposing the polymer monomers to form stabilized polymers.

Optionally, after the stabilized polymers are formed, the liquid crystal molecules are maintained at a deflecting angle, respectively, and the liquid crystal layer has a 3D lens effect.

Optionally, the performing an alignment process on a first substrate provided with a first electrode and a second substrate provided with a second electrode includes: performing a photo alignment process on the first substrate provided with the first electrode and the second substrate provided with the second electrode.

Optionally, the performing an alignment process on a first substrate provided with a first electrode and a second substrate provided with a second electrode includes: performing a rubbing alignment process on the first substrate provided with the first electrode and the second substrate provided with the second electrode.

Optionally, the exposing the polymer monomers includes: exposing the polymer monomers within each region corresponding to one of the electrode units on the first electrode by using a mask plate.

Optionally, a content of the polymer monomers in the mixed liquid is less than 10%.

The present disclosure discloses an electronic product, which includes the display device.

The polymer stabilizing liquid crystal lens and the method for manufacturing the same, the display device and the electronic product according to the embodiments of the present disclosure have following advantageous effects: the liquid crystal molecules of the polymer stabilizing liquid crystal lens are not distorted, and have a high light transmittance; the liquid crystal molecules are subjected to stabilizing action of the polymers, and thus have stable and uniform orientations. Therefore, a good display effect and an excellent comprehensive performance may be obtained. In addition, since the polymer stabilizing liquid crystal lens may have a 3D display effect when no electric field is applied, electric energy may be saved.

DETAILED DESCRIPTION

The implementation of the present disclosure will be described in detail in conjunction with the drawings and embodiments. The following embodiments are intended to illustrate but not limit the scope of the present disclosure.

First Embodiment

Figure 1:
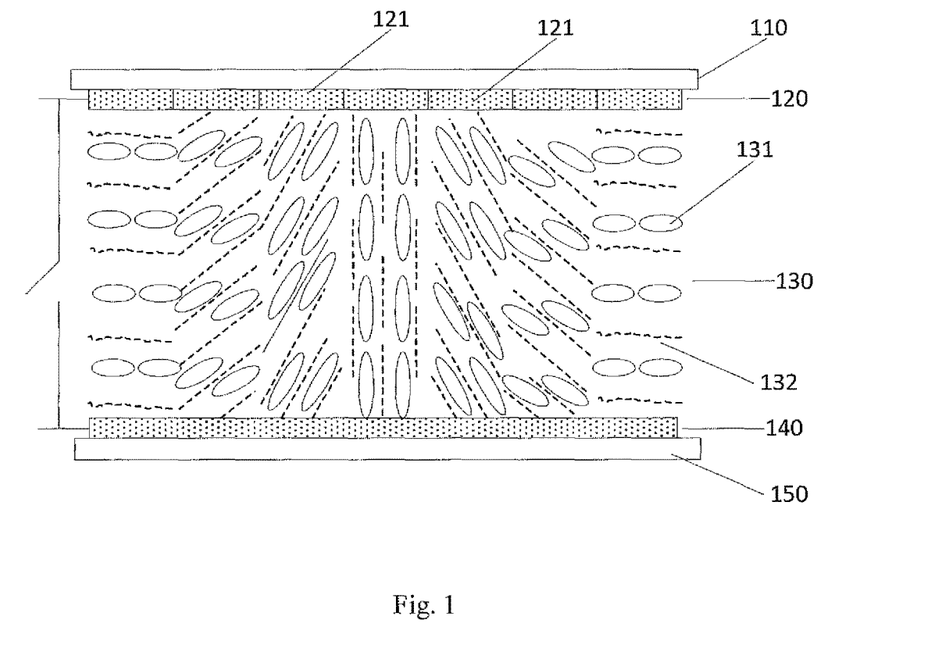
FIG. 1 is a schematic diagram showing a structure of a polymer stabilizing liquid crystal lens according to a first embodiment of the present disclosure.

FIG. 1 is a schematic diagram showing a structure of a polymer stabilizing liquid crystal lens according to the first embodiment of the present disclosure. As shown in FIG. 1, the polymer stabilizing liquid crystal lens includes a first substrate 110, a first electrode 120, a liquid crystal layer 130, a second electrode 140 and a second substrate 150.

The first electrode 120 is disposed on the first substrate 110, i.e., disposed on one side of the first substrate 110 close to the liquid crystal layer 130. The second electrode 140 is disposed on the second substrate 150, i.e., disposed on one side of the second substrate 150 close to the liquid crystal layer 130. The liquid crystal layer 130 is disposed between the first electrode 120 and the second electrode 140.

Specially, the first substrate 110 and the second substrate 150 may be made of resin, glass or plastic material.

The first electrode 120 includes a plurality of electrode units 121. A periodic electric field with voltages changing periodically is generated between the plurality of electrode units 121 and the second electrode 140.

Each of the first electrode 120 and the second electrode 140 is a transparent electrode which is for example made of indium tin oxide (ITO).

The periodic electric field includes electric fields which have voltages changing periodically, and the number of the electric fields is equal to the number of the electrode units 121. As shown in FIG. 1, the periodic electric field will be described in detail hereinafter by taking the first electrode 120 including seven electrode units 121 as an example. However, the present disclosure is not limited this, and the number of the electrode units may be set by one skilled in the art according to needs. Specifically, assuming that voltages (unit volt) on the seven electrode units 121 are sequentially set as 0, +2, +4, +6, −4, −2 and 0 from one side to the other side of the seven electrode units 121, and a voltage on the second electrode 140 is set as 0, then, seven electric fields are formed between the seven electrode units 121 of the first electrode 120 and the second electrode 140, and voltages of the seven electric fields in turn are 0, +2, +4, +6, −4, −2 and 0 respectively. The voltages of the seven electric fields are periodically changed, thereby forming the periodic electric field. The electric field voltages of the periodic electric field may be adjusted according to actual needs, and are not limited to the above assumed voltage values. Further, the number of the electrode units 121 included in the first electrode 120 is not fixed to seven, and may be set according to a size of a display screen of a display device; for example, it may be set to be nine or eleven, etc.

The liquid crystal layer 130 includes polymers 132 and liquid crystal molecules 131. The liquid crystal molecules 131 are deflected under action of the periodic electric filed before the polymers 132 are stabilized, and are maintained at deflecting angles after the polymers 132 are stabilized.

Specially, the polymers 132 are a plurality of polymer monomers before the polymers 132 are stabilized, and the liquid crystal molecules 131 and the polymer monomers are mixed to form a mixed liquid. Under action of the periodic electric field, the liquid crystal molecules 131 are deflected. The liquid crystal layer 130 is divided into a plurality of liquid crystal layer sub-regions along an arranging direction of the plurality of electrode units 121, the number of the liquid crystal layer sub-regions is equal to the number of the electrode units 121. A length of each of the electrode units 121 in the arranging direction is equal to a length of a liquid crystal layer sub-region within a projection area of the each of the electrode units 121 in the arranging direction. The liquid crystal molecules within each of the liquid crystal layer sub-regions are deflected at a corresponding deflecting angle under action of the periodic electric field. The deflecting angles of the liquid crystal molecules 131 within all the liquid crystal layer sub-regions are periodic. When performing a polymerization process on the polymer monomers, the polymer monomers are polymerized in a direction in which liquid crystal molecules 131 are deflected, and thus a stabilized polymer 132 is formed finally. After the polymer 132 is stabilized, the liquid crystal molecules 131 within each of the liquid crystal layer sub-regions are maintained at a deflecting angle, respectively, and the liquid crystal layer 130 has a 3D lens effect. Even if the periodic electric field is removed at this time, the liquid crystal molecules 131 are maintained in the stabilized polymers 132 at the deflecting angle, respectively, and thus a polymer stabilizing liquid crystal lens with a 3D lens effect may be formed.

Optionally, a content of the polymers 132 in the liquid crystal layer 130 is less than 10%.

The polymer stabilizing liquid crystal lens according to the embodiment has following advantages: the liquid crystal molecules are not distorted and have a high light transmittance; since the liquid crystal molecules are subjected to a stabilizing action of the polymers, thus the liquid crystal molecules have uniform and stabilizing orientations, a good display effect and an excellent comprehensive performance may be acquired. Furthermore, since the polymer stabilizing liquid crystal lens has a 3D display effect when no electric field is applied, thus, electric energy may be saved.

Second Embodiment

Figure 2:
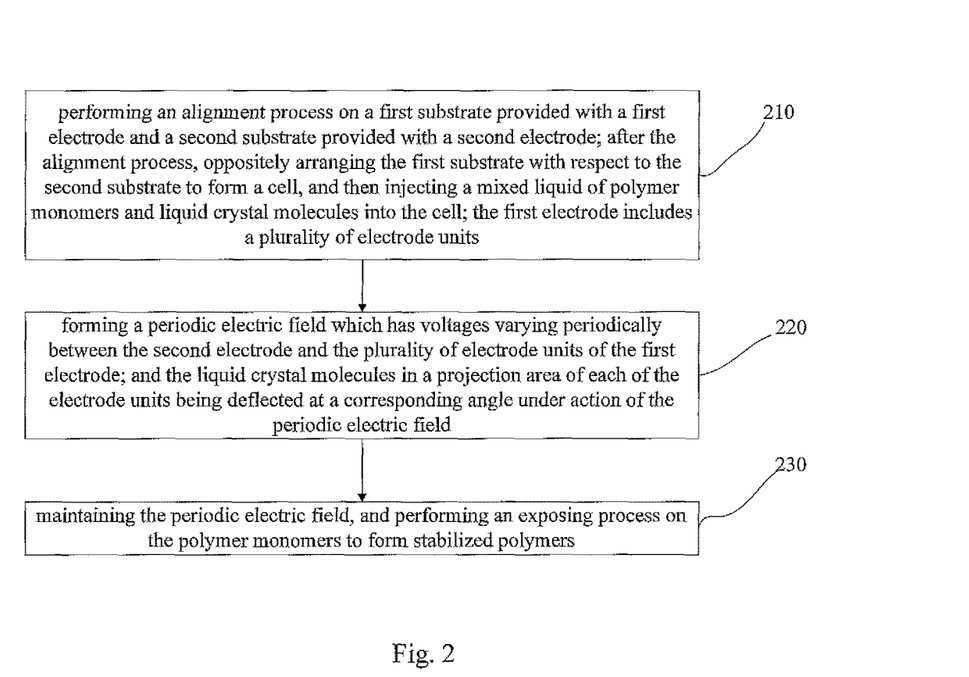
FIG. 2 is a flow chart of a method for manufacturing a polymer stabilizing liquid crystal lens according to a second embodiment of the present disclosure.
Figure 3A:
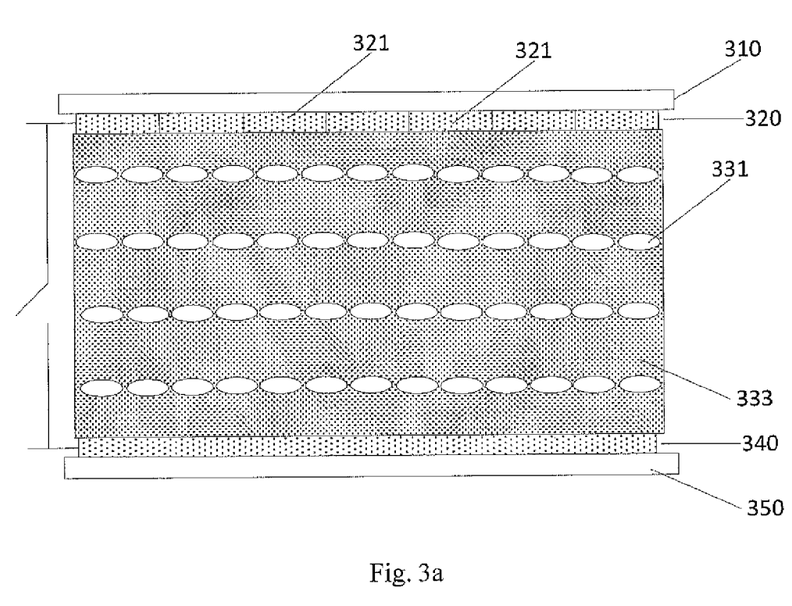
FIGS. 3a to 3e are flow charts showing processes of manufacturing the polymer stabilizing liquid crystal lens according to the second embodiment of the present disclosure.

FIG. 2 is a flow chart of a method of for manufacturing a polymer stabilizing liquid crystal lens according to the second embodiment of the present disclosure. FIGS. 3a to 3e are flow charts showing processes of manufacturing the polymer stabilizing liquid crystal lens according to the second embodiment of the present disclosure. As shown in FIG. 2 and FIGS. 3a to 3e, the method includes:

Step 210, performing an alignment process on a first substrate 310 provided with a first electrode 320 and a second substrate 350 provided with a second electrode 340; after the alignment process, oppositely arranging the first substrate 310 with respect to the second substrate 350 to form a cell, and then injecting a mixed liquid of polymer monomers 333 and liquid crystal molecules 331 into the cell. The first electrode 320 includes a plurality of electrode units.

Specially, Step 210 may further include:

Step 211, providing the first electrode 320 on the first substrate 310; the first electrode 320 includes a plurality of electrode units 321.

Step 212, providing the second electrode 340 on the second substrate 350.

Specially, both of the first substrate 310 and the second substrate 350 may be made of resin, glass or plastic material. Both of the first electrode 320 and the second electrode 340 may be a transparent electrode which for example is made of ITO.

Step 213, performing the alignment process on the first substrate 310 provided with the first electrode 320 and the second substrate 350 provided with the second electrode 340 through a photo alignment.

In Step 213, a rubbing alignment may also be adopted to perform the alignment process. When adopting the rubbing alignment, the liquid crystal molecules 331 may have a certain pretilt angle in a subsequent step, which affects distribution of the liquid crystals after an electric field is applied. Although the solution of the present disclosure may be achieved by adopting the rubbing alignment, the effect thereof is poorer than that of adopting the photo alignment. Thus, the photo alignment is optionally adopted to perform the alignment process on the liquid crystal molecules 331 according to this embodiment. As shown in FIG. 3a, after performing the alignment process through adopting the photo alignment, the liquid crystal molecules 331 have a pretilt angle close to 0, and have a horizontal orientation.

Step 214, after the alignment process, oppositely arranging the first substrate 310 with respective to the second substrate 350 to form a cell; the first electrode 320 and the second electrode 340 being oppositely arranged to each other.

Step 215, injecting the mixed liquid of the polymer monomers 333 and the liquid crystal molecules 331 into the cell.

A content of the polymer monomers 333 in the mixed liquid is less than 10%.

Step 220, forming a periodic electric field which has voltages varying periodically between the second electrode 340 and the plurality of electrode units 321 of the first electrode 320; and the liquid crystal molecules 331 in a projection area of each of the electrode units 321 being deflected at a corresponding angle under action of the periodic electric field.

Figure 3B:
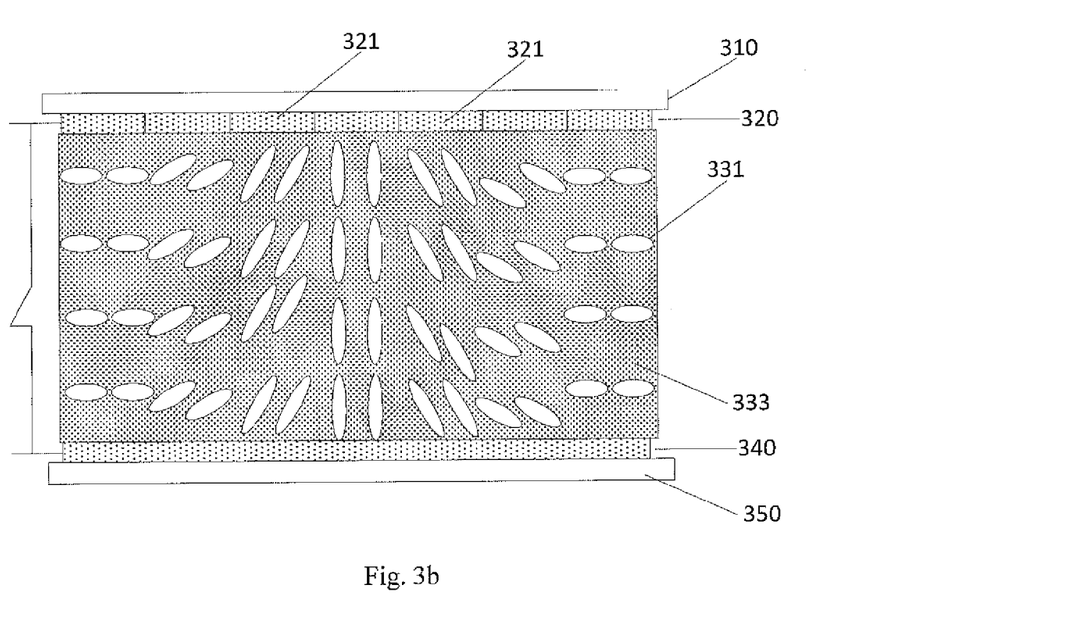

The periodic electric field includes electric fields which have voltages varying periodically, and the number of the electric fields is equal to the number of the electrode units 321. As shown in FIG. 3b, the liquid crystal molecules 331 within a region corresponding to each of the electrode units 321 are deflected at a corresponding angle under action of the electric field generated by the each of the electrode units 321 and the second electrode 340. The deflecting angles of the liquid crystal molecules within the entire periodic electric field are periodic.

Step 230, maintaining the periodic electric field, and performing an exposing process on the polymer monomers 333 to form stabilized polymers 332.

The stabilized polymers 332 make the liquid crystal molecules 331 maintained at the deflecting angle, respectively. The stabilized polymers 332 containing the liquid crystal molecules 331, i.e., the liquid crystal layer, have a 3D lens effect.

Specially, in Step 230, the polymer monomers 333 may be collectively exposed, i.e., all the polymer monomers 333 between the first electrode 320 and the second electrode 340 may be simultaneously exposed so that all the polymer monomers 333 are polymerized to form stabilized polymers 332. Although the solution of the present disclosure may be achieved by adopting such a polymerization mode, since there may be interactions i.e., forming covalent bonds, between the polymer monomers 333 within regions corresponding to adjacent electrode units 321 when the polymer monomers 333 are collectively exposed, thus, a stable state of the liquid crystal molecules 331 located on an interface between adjacent electrode units 321 may be affected.

In this embodiment, optionally, exposing the polymer monomers 333 within each region corresponding to one of the electrode units 321 on the first electrode 320 though using a mask plate 360.

Figure 3C:
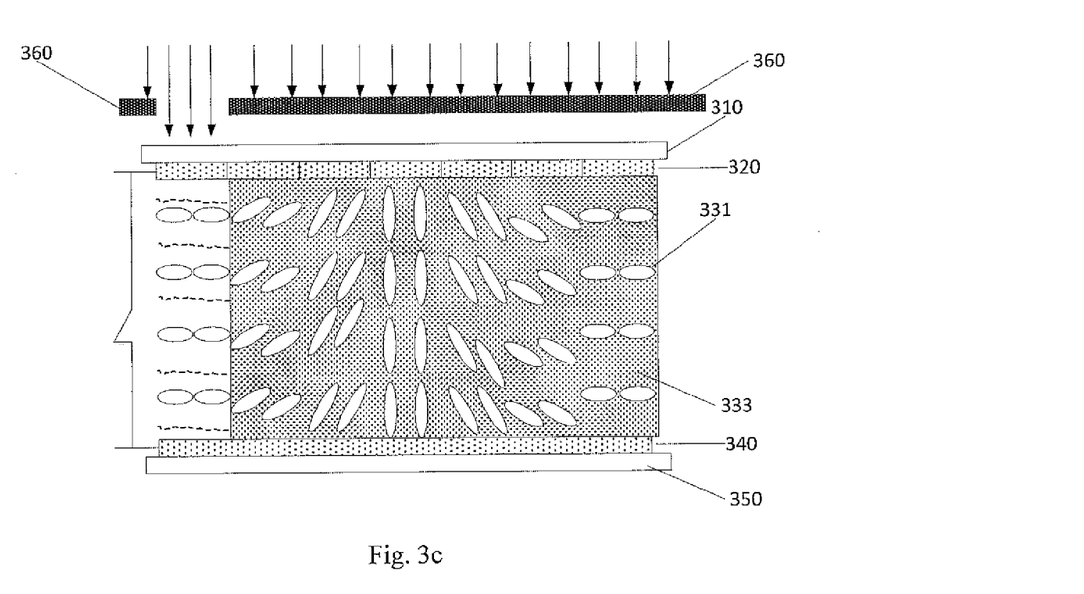

First referring to FIG. 3c, when the polymer monomers 333 within a region corresponding to a first electrode unit 321 are exposed by using the mask plate 360, the polymer monomers 333 within this region are polymerized to form a part of the stabilized polymers. Meanwhile, the polymer monomers 333 within a region corresponding to a second electrode unit 321 are not exposed, and covalent bonds are less likely generated between the polymer monomers 333 on an interface between the first electrode unit 321 and the second electrode unit 321.

Figure 3D:
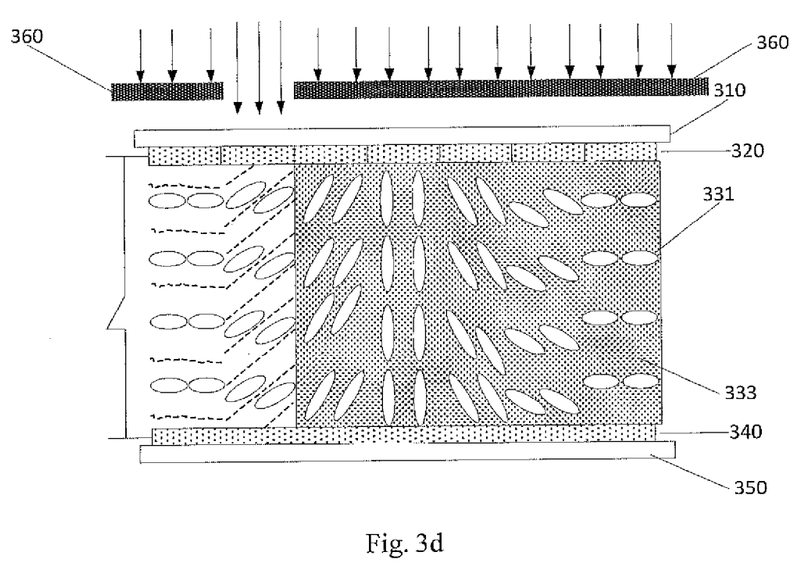
Figure 3E:
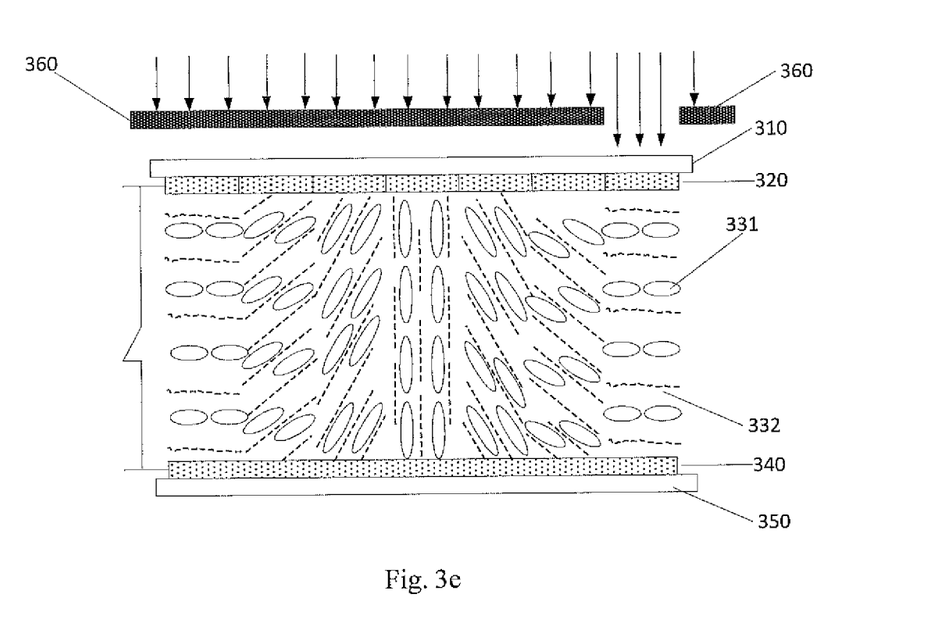

Referring to FIG. 3d, when the polymer monomers 333 within the region corresponding to the second electrode unit 321 are exposed by using the mask plate 360, the polymer monomers 333 within this region are polymerized to form a part of the stabilized polymers. At this time, the polymer monomers 333 within a region corresponding to a third electrode unit 321 are not exposed and covalent bonds are less likely generated between the polymer monomers 333 on an interface between the second electrode unit 321 and the third electrode unit 321. Meanwhile, since the polymer monomers 333 within the region corresponding to the first electrode unit 321 have already formed into a part of the stabilized polymers, thus, covalent bonds are less likely generated between the polymer monomers 333 on the interface between the second electrode unit 321 and the first electrode unit 321. In this way, referring to FIG. 3e, after the polymer monomers 333 within a region corresponding to a last electrode unit 321 are exposed by using the mask plate 360, all of the polymer monomers 333 form into the stabilized polymers 332. At this time, after the periodic electric field is removed, the liquid crystal molecules 331 are still maintained at the deflecting angles in Step 230, thereby forming a polymer stabilizing liquid crystal lens.

In addition, when a plurality of periodic electric fields are generated between the first electrode 320 and the second electrode 340, the polymer monomers 333 within each region corresponding to one of the electrode units 321 may be exposed according to periods of the periodic electric fields. That is, the polymer monomers 333 within a region of all the periodic electric fields corresponding to the first electrode unit 321 are first exposed, and then the polymer monomers 333 within a region of all the periodic electric fields corresponding to the second electrode unit 321 are exposed, and then the polymer monomers 333 within a region of all of the periodic electric fields corresponding to the third electrode unit 321 are exposed. In this way, this is performed until the polymer monomers 333 within a region of all of the periodic electric fields corresponding to a last electrode unit 321 are exposed.

The method for manufacturing the polymer stabilizing liquid crystal lens according to this embodiment does not need to expose the polymer monomers 333 within different regions corresponding to the electrode units 321 at different intensities, has a low requirement for controlling a pretilt angle of the liquid crystal molecules 331, a simple preparation process and is easy to be implemented. Meanwhile, in the manufactured polymer stabilizing liquid crystal lens, the liquid crystal molecules are not distorted and have a high light transmittance. The liquid crystal molecules are subjected to the stabilizing action of the polymers, and thus have uniform and stable orientations. Therefore, a good display effect and an excellent comprehensive performance may be acquired. Furthermore, since the polymer stabilizing liquid crystal lens has a 3D display effect when no electric field is applied, thus, the electric energy may be saved.

Third Embodiment

A display device is provided according to the third embodiment. The display device includes the polymer stabilizing liquid crystal lens according to the first embodiment. Since the polymer stabilizing liquid crystal lens may have a 3D display effect when no electric field is applied, thus, there is no need to directly make the polymer stabilizing liquid crystal lens into a module. The polymer stabilizing liquid crystal lens may be attached on a surface of a display screen in a way of film pasting, thereby facilitating replacement during repairing and maintenance.

Specially, the display device may be a TV, a mobile phone, or a tablet computer etc.

Fourth Embodiment

An electronic product is provided according to the fourth embodiment. The electronic product includes the display device according to the third embodiment. Since the polymer stabilizing liquid crystal lens of the display device may have a 3D display effect when no electric field is applied, thus there is no need to directly make the polymer stabilizing liquid crystal lens into a module. The polymer stabilizing liquid crystal lens may be attached on a surface of a display screen of the electronic product in a way of film pasting, thereby facilitating replacement during repairing and maintenance.

Specially, the electronic product may be a household appliance, a communication apparatus, an engineering apparatus or an electronic entertainment product, etc.

In the polymer stabilizing liquid crystal lens according to one embodiment of the present disclosure, the liquid crystal molecules are not distorted and have a high light transmittance. The liquid crystals are subjected to the stabilizing action of the polymers so as to have uniform and stable orientations, and thus have a good display effect and an excellent comprehensive performance. In addition, since the polymer stabilizing liquid crystal lens may have a 3D display effect when no electric field is applied, the electric energy may be saved. In the method, the polymer monomers within different regions corresponding to the electrode units are not needed to be exposed at different intensities, and the method has a low requirement for controlling a pretilt angle of the liquid crystal molecules, a simple preparation process and is easy to be implemented.

The above embodiments are merely intended to illustrate but not limit the present disclosure. Various changes and variations may be made by one skilled in the art without departing from the spirit and scope of the present disclosure. Therefore, all the equivalent technical solutions may fall within the scope of the present disclosure, and the protection scope of the present disclosure should be defined by the claims.

What is claimed is:

1. A polymer stabilizing liquid crystal lens, comprising a first substrate, a first electrode, a liquid crystal layer, a second electrode and a second substrate; wherein
the first electrode is disposed on the first substrate;
the second electrode is disposed on the second substrate;
the liquid crystal layer is disposed between the first electrode and the second electrode; the first electrode comprises a plurality of electrode units; and a periodic electric field which has voltages varying periodically is generated between the plurality of the electrode units and the second electrode; and
the liquid crystal layer comprises polymers and liquid crystal molecules; the liquid crystal molecules are deflected under action of the periodic electric field for stabilizing the polymers with the liquid crystal molecules maintained in the stabilized polymers at deflecting angles such that the liquid crystal layer has a 3D lens effect when no electric field is applied.

2. The polymer stabilizing liquid crystal lens according to claim 1, wherein
the liquid crystal layer is divided into a plurality of liquid crystal layer sub-regions in an arranging direction of the plurality of the electrode units, the number of the liquid crystal layer sub-regions is equal to the number of the electrode units;
a length of each of the electrode units in the arranging direction is equal to a length of the liquid crystal layer sub-region within a projection area of the each of the electrode units in the arranging direction;
the liquid crystal molecules within each of the liquid crystal layer sub-regions are deflected at a corresponding angle under action of the periodic electric field; the liquid crystal molecules within each of the liquid crystal layer sub-regions are maintained at a deflecting angle, respectively, after the polymers are stabilized, and the liquid crystal layer has the 3D lens effect.

3. The polymer stabilizing liquid crystal lens according to claim 2, wherein a content of the polymers in the liquid crystal layer is less than 10%.

4. The polymer stabilizing liquid crystal lens according to claim 1, wherein a content of the polymers in the liquid crystal layer is less than 10%.

5. The polymer stabilizing liquid crystal lens according to claim 1, wherein the first substrate and the second substrate are made of resin, glass or plastic material.

6. A display device, comprising a display screen and a polymer stabilizing liquid crystal lens according to claim 1 provided on the display screen.

7. A method for manufacturing a polymer stabilizing liquid crystal lens, comprising:
performing an alignment process on a first substrate provided with a first electrode and a second substrate provided with a second electrode, oppositely arranging the first substrate and the second substrate which are subjected to the alignment process to form a cell, and injecting a mixed liquid of polymer monomers and liquid crystal molecules into the cell; the first electrode comprising a plurality of electrode units;

generating a periodic electric field which has voltages varying periodically between the second electrode and the plurality of electrode units of the first electrode; the liquid crystal molecules within a projection area of each of the electrode units being deflected at a corresponding angle under action of the periodic electric field;

maintaining the periodic electric field and exposing the polymer monomers to form stabilized polymers with the liquid crystal molecules maintained in the stabilized polymers at deflecting angles such that the liquid crystal layer has a 3D lens effect when no electric field is applied.

8. The method according to claim 7, wherein the performing an alignment process on a first substrate provided with a first electrode and a second substrate provided with a second electrode comprises: performing a photo alignment process on the first substrate provided with the first electrode and the second substrate provided with the second electrode.

9. The method according to claim 7, wherein the performing an alignment process on a first substrate provided with a first electrode and a second substrate provided with a second electrode comprises: performing a rubbing alignment process on the first substrate provided with the first electrode and the second substrate provided with the second electrode.

10. The method according to claim 7, wherein the exposing the polymer monomers comprises: exposing the polymer monomers within each region corresponding to one of the electrode units on the first electrode by using a mask plate.

11. The method according to claim 7, wherein the performing an alignment process on a first substrate provided with a first electrode and a second substrate provided with a second electrode comprises: performing a photo alignment process on the first substrate provided with the first electrode and the second substrate provided with the second electrode.

12. The method according to claim 7, wherein the performing an alignment process on a first substrate provided with a first electrode and a second substrate provided with a second electrode comprises: performing a rubbing alignment process on the first substrate provided with the first electrode and the second substrate provided with the second electrode.

13. The method according to claim 7, wherein the exposing the polymer monomers comprises: exposing the polymer monomers within each region corresponding to one of the electrode units on the first electrode by using a mask plate.

14. The method according to claim 7, wherein a content of the polymer monomers in the mixed liquid is less than 10%.

15. The polymer stabilizing liquid crystal lens according to claim 1, wherein the first electrode comprises at least N electrode units which correspond to one periodic electric field, where N is an odd number and is larger than or equal to seven;

the liquid crystal layer is divided into at least N liquid crystal layer sub-regions in an arranging direction of the at least N electrode units by the at least N electrode units;

the at least N liquid crystal layer sub-regions corresponds to the at least N electrode units in a one-to-one manner;

the at least N liquid crystal layer sub-regions includes a first liquid crystal layer sub-region to an N-th liquid crystal layer sub-region in the arranging direction of the at least N electrode units;

the liquid crystal molecules in an X-th liquid crystal layer sub-region are maintained at an X-th deflecting angle by the stabilized polymers in the X-th liquid crystal layer sub-region, where X is larger than or equal to 1 and smaller than or equal to N;

in the arranging direction of the at least N electrode units, the first deflecting angle to the N-th deflecting angle first increase monotonically and then decrease monotonically.

16. The polymer stabilizing liquid crystal lens according to claim 15, wherein N is one of seven, nine and eleven.

17. The polymer stabilizing liquid crystal lens according to claim 16, wherein a difference between the first deflecting angle and an [(N+1)/2]-th deflecting angle is 90.

18. The polymer stabilizing liquid crystal lens according to claim 17, wherein the X-th deflecting angle is equal to an (N−X+1)-th deflecting angle.

19. The method according to claim 7, wherein the first electrode comprises at least N electrode units which correspond to one periodic electric field, where N is an odd number and is larger than or equal to seven;

the liquid crystal layer is divided into at least N liquid crystal layer sub-regions in an arranging direction of the at least N electrode units by the at least N electrode units;

the at least N liquid crystal layer sub-regions corresponds to the at least N electrode units in a one-to-one manner;

the at least N liquid crystal layer sub-regions includes a first liquid crystal layer sub-region to an N-th liquid crystal layer sub-region in the arranging direction of the at least N electrode units;

the step of maintaining the periodic electric field and exposing the polymer monomers to form stabilized polymers with the liquid crystal molecules maintained at deflecting angles in the stabilized polymers in such a manner that the liquid crystal layer forms a 3D lens effect when no electric field is applied comprises:

maintaining the periodic electric field and exposing the polymer monomers to form the stabilized polymers with the liquid crystal molecules in an X-th liquid crystal layer sub-region maintained at an X-th deflecting angle in the stabilized polymers in the X-th liquid crystal layer sub-region, where X is larger than or equal to 1 and smaller than or equal to N, and that in the arranging direction of the at least N electrode units, the first deflecting angle to the N-th deflecting angle first increase monotonically and then decrease monotonically.

20. The method according to claim 19, wherein N is one of seven, nine and eleven;

wherein a difference between the first deflecting angle and an [(N+1)/2]-th deflecting angle is 90;

wherein the first deflecting angle is equal to the N-th deflecting angle, and the X-th deflecting angle is equal to an (N−X+1)-th deflecting angle.

* * * * *